(12) United States Patent
Ishihara

(10) Patent No.: US 6,657,819 B2
(45) Date of Patent: Dec. 2, 2003

(54) MAGNETIC HEAD HAVING PROTRUSION ON MEDIUM OPPOSING SURFACE AND MAGNETIC RECORDING APPARATUS

(75) Inventor: Hirohisa Ishihara, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 201 days.

(21) Appl. No.: 09/745,695

(22) Filed: Dec. 22, 2000

(65) Prior Publication Data

US 2001/0040765 A1 Nov. 15, 2001

(30) Foreign Application Priority Data

Dec. 27, 1999 (JP) .......................................... 11-371939

(51) Int. Cl.$^7$ ................................................ G11B 5/60
(52) U.S. Cl. ................................ 360/235.7; 360/235.1; 360/236.3
(58) Field of Search .......................... 360/235.6–235.9, 360/236.1, 236.2, 236.5, 236.3, 235.1, 235.3

(56) References Cited

U.S. PATENT DOCUMENTS

| | | | |
|---|---|---|---|
| 5,200,867 A | 4/1993 | Albrecht et al. | |
| 5,267,104 A | 11/1993 | Albrecht et al. | |
| 5,267,109 A | 11/1993 | Chapin et al. | |
| 5,285,337 A | 2/1994 | Best et al. | |
| 5,768,055 A | 6/1998 | Tian et al. | |
| 5,796,551 A | 8/1998 | Samuelson | |
| 5,886,856 A | 3/1999 | Tokuyama et al. | |
| 5,898,542 A | * 4/1999 | Koshikawa et al. | 360/234.7 |
| 6,023,394 A | * 2/2000 | Ito et al. | 360/235.5 |
| 6,157,519 A | * 12/2000 | Kohira et al. | 360/245 |
| 6,256,171 B1 | * 7/2001 | Yoda et al. | 360/235.3 |
| 6,333,836 B1 | * 12/2001 | Boutaghou et al. | 360/234.7 |
| 6,396,663 B1 | * 5/2002 | Kasamatsu | 360/235.7 |
| 6,396,664 B2 | * 5/2002 | Koishi et al. | 360/235.6 |
| 6,424,493 B1 | 7/2002 | Matsumoto et al. | |
| 6,424,494 B1 | * 7/2002 | Koishi | 360/235.6 |

FOREIGN PATENT DOCUMENTS

| | | |
|---|---|---|
| JP | 5-198116 | 8/1993 |
| JP | 7-98951 | 4/1995 |
| JP | 8-147918 | 6/1996 |
| JP | 11-339416 | 12/1999 |

* cited by examiner

*Primary Examiner*—Robert S. Tupper
(74) *Attorney, Agent, or Firm*—Brinks Hofer Gilson & Lione

(57) ABSTRACT

Disclosed is a magnetic head in which there is no fear of the surface of the magnetic recording medium being damaged by the acute edge portion of the magnetic head if the magnetic head approaches the magnetic recording medium in an inclined state. According to the present invention, there are provided on the medium opposing surface of the slider main body rail portions for causing the slider main body to fly, wherein, in the slider main body, the upstream side with respect to the rotating direction of the magnetic recording medium is the leading side, the downstream side with respect to the rotating direction being the trailing K side, and wherein there is provided in a corner portion of the medium opposing surface on the trailing side of the slider main body a protrusion which is lower than the sub rail portion and which is closer to the magnetic recording medium than the end portion on the trailing side of the slider main body in the rolling state of the slider main body.

6 Claims, 6 Drawing Sheets

MAGNETIC HEAD HAVING PROTRUSION ON MEDIUM OPPOSING SURFACE AND MAGNETIC RECORDING APPARATUS

BACKGROUND OF THE INVENTION

1. Field of the Invention

The present invention relates to a magnetic recording apparatus provided with a magnetic core adapted to read and write magnetic information while moving relative to a magnetic recording medium which is rotated and, in particular, to a technique which makes it possible to prevent the trailing side corner portion of a slider main body from being brought into contact with the magnetic recording medium when the slider main body flies in an inclined state with respect to the magnetic recording medium.

2. Description of the Related Art

Conventionally, a magnetic recording apparatus having a construction as shown in FIG. 7 has been known as an information recording apparatus for a personal computer or the like.

In the magnetic recording apparatus M shown in FIG. 7, a plurality of disc-like magnetic disk 100, on which magnetic layers are formed, are rotatably provided on a chassis 101, and a plurality of magnetic heads 102 are provided so as to be capable of moving relative to the obverse or the reverse side of each of these magnetic disk 100. Each of these magnetic heads 102 is individually supported by a base 105 through the intermediation of a thin and narrow load beam 103 in the form of a triangular plate and an arm 104, and this base 105 is rotatably supported on the chassis 101. That is, in the construction shown in FIG. 7, the base 105 rotates to thereby cause the magnetic heads 102 to move radially relative to the magnetic disks 100, and magnetic information at desired positions on the magnetic disk 100 is read, or magnetic information is written to desired positions on the magnetic disks 100.

The base 105 rotates around a rotation shaft 106 arranged parallel to the rotation shaft 100 of the magnetic disks 100 to thereby cause the magnetic heads 102 to move radially over (or under) the magnetic disks 100, whereby the support structure for the base 105 shown in FIG. 7 is realized. The structure for driving the base 105 shown in FIG. 7 is a voice coil motor structure in which a voice coil 108 and an electromagnet 109 are combined. Apart from this, a variety of structures are known as base driving mechanisms, such as a drive structure using a linear motor.

FIG. 8 shows the above magnetic head 102 in a condition in which the medium facing side thereof is directed upwardly. This magnetic head 102 mainly comprises a plate-like slider main body 111 consisting of a non-magnetic material such as ceramic, and a magnetic core 112 having a coil portion provided at the center of the end surface at one end of the slider main body 111. In the slider main body 111 of the magnetic head main body 102, the inner side of FIG. 8 is the leading side 113 on the upstream side with respect to the rotating direction, and the near side is the trailing side 115 on the downstream side with respect to the rotating direction. Further, at the end of the leading side 113 of the slider main body 111, there is formed a protrusion 117 having an inclined surface 116. Further, main rail portions 118 are formed on both sides of the slider main body 111, and a sub rail portion 119 is formed at the center of the end portion on the trailing side 115 of the slider main body 111.

In the magnetic head 102 shown in FIG. 7, the rail portions 118 and 119 receive positive pressure by the air flow generated as a result of the rotation of the magnetic recording medium 100, so that it flies over the obverse or reverse surface of the magnetic recording medium, and in this condition, it reads the magnetic information of the magnetic recording medium 100 or writes magnetic information to the magnetic recording medium 100.

A flying system called a lamp load system has recently been adopted for use in the magnetic head of conventional magnetic recording apparatus. In this system, a retraction portion having an inclined surface is provided on the side of the rotated magnetic recording medium so as to be spaced apart therefrom, and when the rotation of the magnetic recording medium is stopped, the magnetic head 102 which has been flying over the magnetic recording medium is moved to the retraction portion side by way of the inclined surface of the retraction portion, whereby there is no fear of the magnetic head 102 adhering to the obverse or reverse side of the magnetic recording medium 100 when the rotation of the magnetic recording medium 100 is stopped.

In contrast, in the conventionally used magnetic head of CSS (contact start stop) system, the magnetic head is pressed against the obverse or reverse surface of the magnetic recording medium due to the elastic force of the load beam or the flexure when the rotation of the magnetic recording medium is stopped, so that if both the surface of the magnetic recording medium and the slider portion of the magnetic head are mirror-finished, the magnetic head 102 is liable to adhere to the surface of the magnetic recording medium, and, due to the adhesion, there is a fear of the magnetic head undergoing crashing.

In the magnetic head of the lamp load system described above, the magnetic head is retracted to the side of the magnetic recording medium when the rotation of the magnetic recording medium is stopped, so that there is no fear of the magnetic head undergoing adhesion, and it is possible to provide a magnetic head in which there is little fear of crashing being generated. In the lamp load system, however, there are problems as described below.

In the magnetic head of the lamp load system, the slider main body, which moves in the radial direction of the magnetic recording medium along the inclined surface of the retraction portion to move to the obverse side or the reverse side of the magnetic recording medium, may approach the obverse or reverse side of the magnetic recording medium while maintaining the condition in which it is inclined by a minute angle (approximately $1 \times 10^{-5}$ rad) (the rolling state in which one side with respect to the width direction of the slider main body is above or below). It is to be assumed that the inclination angle of at this time is very minute. However, due to the fact that the magnetic head approaches the magnetic recording medium in an inclined state, there is a possibility of the acute corner portion of the slider main body of the magnetic head being brought into contact with the magnetic recording medium.

For example, in the case of the slider main body 111 of the magnetic head 102 shown in FIG. 8, the leading side 113 is greatly spaced apart from the magnetic recording medium 100 due to the air pressure as a result of the rotation of the magnetic recording medium 100, and the trailing side 115 is somewhat closer to the magnetic recording medium 100, 50 that when it flies, the end portion on the trailing side 115 of the magnetic head 102 is closest to the magnetic recording medium 102. However, in a case in which, as described above, the magnetic head 102 transversely approaches the magnetic recording medium 100 in the radial direction along the inclined surface of the retraction portion from the condition in which it is inclined, and then starts to fly, the slider main body 11 is brought into an inclined state in which rolling occurs, and in the initial state in which the flying attitude is assumed, one of the end portions 120 on both sides with respect to the width direction of the trailing side 115 of the slider main body 111 of FIG. 8, approaches closest to the surface of the magnetic recording medium 100, with the result that there is a fear of one end portion 120 being brought into contact with the surface of the magnetic recording medium 100.

In particular, it is to be assumed that this problem is liable to be generated when an impact or load is applied from outside at the time of lamp loading, in which the flying attitude is assumed after bringing the magnetic head 102 close to the magnetic recording medium 100 and, further, at the time of seeking, in which the magnetic recording head 102 is moved to the outside of the magnetic recording medium 100.

Conventionally, to prevent this problem, the end portion on the trailing side 115 of the magnetic head 102 is ground with a grinding tape to round it off. However, it is difficult to achieve a high accuracy in machining, and further, the cost of machining can be prohibitive.

SUMMARY OF THE INVENTION

The present invention has been made in view of the above problem. Accordingly, it is an object of the present invention to provide a structure in which, when the slider main body of the magnetic head flies over the magnetic recording medium, there is no fear of the end portion on the trailing side of the slider main body coming into contact with the magnetic recording medium to damage the same.

A second object of the present invention is to provide a structure in which, when a magnetic head of the lamp load system is adopted, if there is a fear of the edge portion on the trailing side of the slider main body of the magnetic head being brought into contact with the magnetic recording medium due to the flying attitude, the protrusion formed is not acute but rounded off to thereby prevent the magnetic recording medium from being damaged.

To achieve the above objects, there is provided, in accordance with the present invention, a magnetic head comprising a magnetic head slider including a slider main body which flies with a medium opposing surface being directed to a rotated magnetic recording medium and which is provided with a magnetic core for performing recording or reproduction of magnetic information, wherein there is provided on the medium opposing surface of the slider main body a rail portion for flying, wherein, in the slider main body, the upstream side with respect to the rotating direction of the magnetic recording medium is the leading side, the downstream side with respect to the rotating direction being the trailing side, and wherein there is provided in a corner portion of the medium opposing surface on the trailing side of the slider main body a protrusion which is lower than the rail portion and which is closer to the magnetic recording medium than the end portion on the trailing side of the slider main body in the rolling state of the slider main body.

When the slider main body is to run while being inclined with respect to the magnetic recording medium so as to cause rolling, one of the end portions with respect to the width direction on the trailing side of the slider main body approaches the magnetic recording medium. If, in this case, an impact or load applied from outside, the protrusion comes into contact with the magnetic recording medium before the end portion on the trailing side of the slider main body comes into contact with the magnetic recording medium. By making the configuration of this protrusion such that it is not acute as the corner portion of the end portion of the slider main body, there is no fear of the magnetic recording medium being damaged if the protrusion comes into contact with the magnetic recording medium.

In accordance with the present invention, there is further provided a magnetic head comprising a magnetic head slider including a slider main body which flies with a medium opposing surface being directed to the rotated magnetic recording medium and which is provided with a magnetic core for performing recording or reproduction of magnetic information, wherein, in the slider main body, the upstream side with respect to the rotating direction of the magnetic recording medium is the leading side, the downstream side with respect to the rotating direction being the trailing side, wherein a rail portion for flying the slider main body is formed on the medium opposing surface of the slider main body so as to extend from the leading side to the trailing side, and wherein there is provided in the end portion on the trailing side of the rail portion a rail step portion which is positioned in a corner portion of the medium opposing surface on the trailing side of the slier main body and which is lower than the other portion of the rail portion.

The rail step portion formed on the trailing side of the rail portion causes the trailing side of the magnetic head to fly by generating positive pressure when the magnetic head flies, so that the force with which the trailing side of the magnetic head is brought into contact with the magnetic recording medium is restrained. Thus, if rolling is caused in the magnetic head by an impact or load from outside, it is possible to prevent the end portion on the trailing side from hitting hard against the magnetic recording medium. Further, it is more desirable to round off the corner portion on the trailing side of the rail step portion.

In the magnetic head of the present invention, the rail portion is provided with a sub rail portion formed at the center of the medium opposing surface on the trailing side of the slider main body, and a main rail portion formed so as to extend from the leading side of the slider main body positioned on the upstream side with respect to the rotating direction of the magnetic recording medium to the trailing side of the slider main body, and a magnetic core is formed in the vicinity of the sub rail portion, and the height of the protrusion or the rail step portion is smaller than the height of the sub rail portion.

In the magnetic head of the present invention, the relationship: $(L_1 \times h_1/L_2) < h_2 < h_1 - (L_2 - L_1) \times 10^{-5}$ (mm) holds true, where $h_1$ is the height of the sub rail portion, $h_2$ is the height of the protrusion, $L_1$ is the distance from the side surface of the slider main body to the protrusion, and $L_2$ is the distance from the side surface of the slider main body to the sub rail portion.

By adjusting the height of the protrusion so as to satisfy the above relationship, the protrusion does not become lower than the sub rail portion if rolling is caused in the magnetic head and the magnetic head is inclined by approximately $1 \times 10^{-5}$ rad, so that it is possible to prevent the end portion of the slider main body on the trailing side of the magnetic head from colliding with the magnetic recording medium.

In the magnetic head of the present invention, protrusions are formed on both sides of the sub rail portion, each protrusion being formed in a round or elliptical configuration rounded off by not less than $5 \times 10^{-6}$ m.

When the protrusion is formed in a round or elliptical configuration, there is little fear of the magnetic recording medium being damaged if the protrusion comes into contact with the magnetic recording medium.

In the magnetic head of the present invention, the slider main body is composed of a min body portion which occupies the greater portion of the leading side and the trailing side and which is formed of a non-magnetic hard ceramic material, and an insulating layer formed by coating at the end portion on the trailing side of this main body portion, wherein the magnetic core is embedded in the insulating layer, the protrusion being formed in the border portion between the main body portion and the insulating layer.

In accordance with the present invention, there is further provided a magnetic recording apparatus comprising a magnetic head as described above, a magnetic recording medium which is rotated, and a supporting mechanism for moving the magnetic head in the radial direction of the magnetic recording medium.

In a magnetic recording apparatus provided with the above-described magnetic head, if an impact or load is applied from outside, there is little fear of the magnetic recording medium being damaged by the magnetic head which is running.

DESCRIPTION OF THE PREFERRED EMBODIMENTS (First Embodiment)

A first embodiment of the present invention will now be described with reference to the drawings. The present invention, however, is not restricted to this embodiment.

Figure 1:
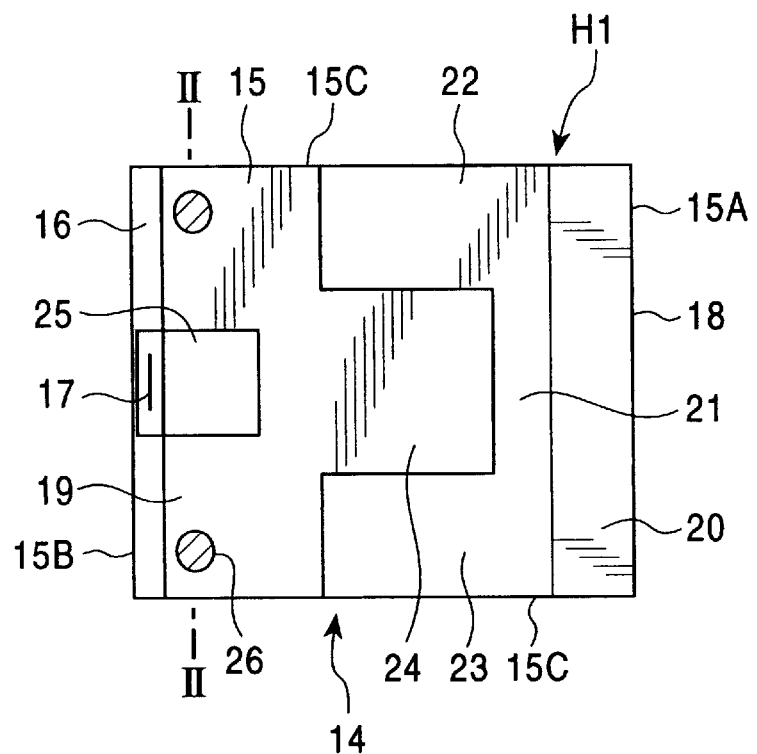
FIG. 1 is a bottom view of a magnetic head according to a first embodiment of the present invention.
Figure 2:
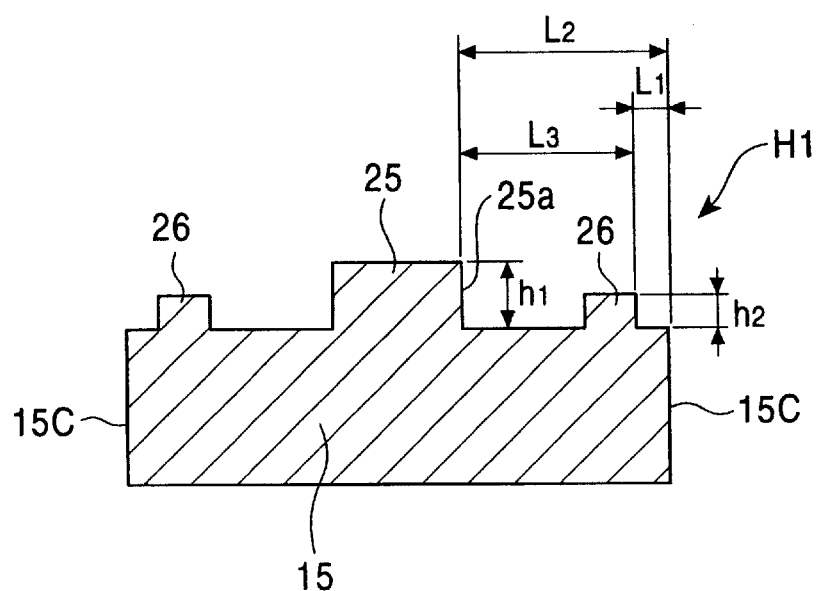
FIG. 2 is a sectional view taken along the line II—II of the magnetic head shown in FIG. 1.

FIG. 1 shows a magnetic head slider of the first embodiment of the present invention. The magnetic head H1 of this embodiment is mounted in the magnetic recording apparatus shown in FIG. 3.

Figure 3:
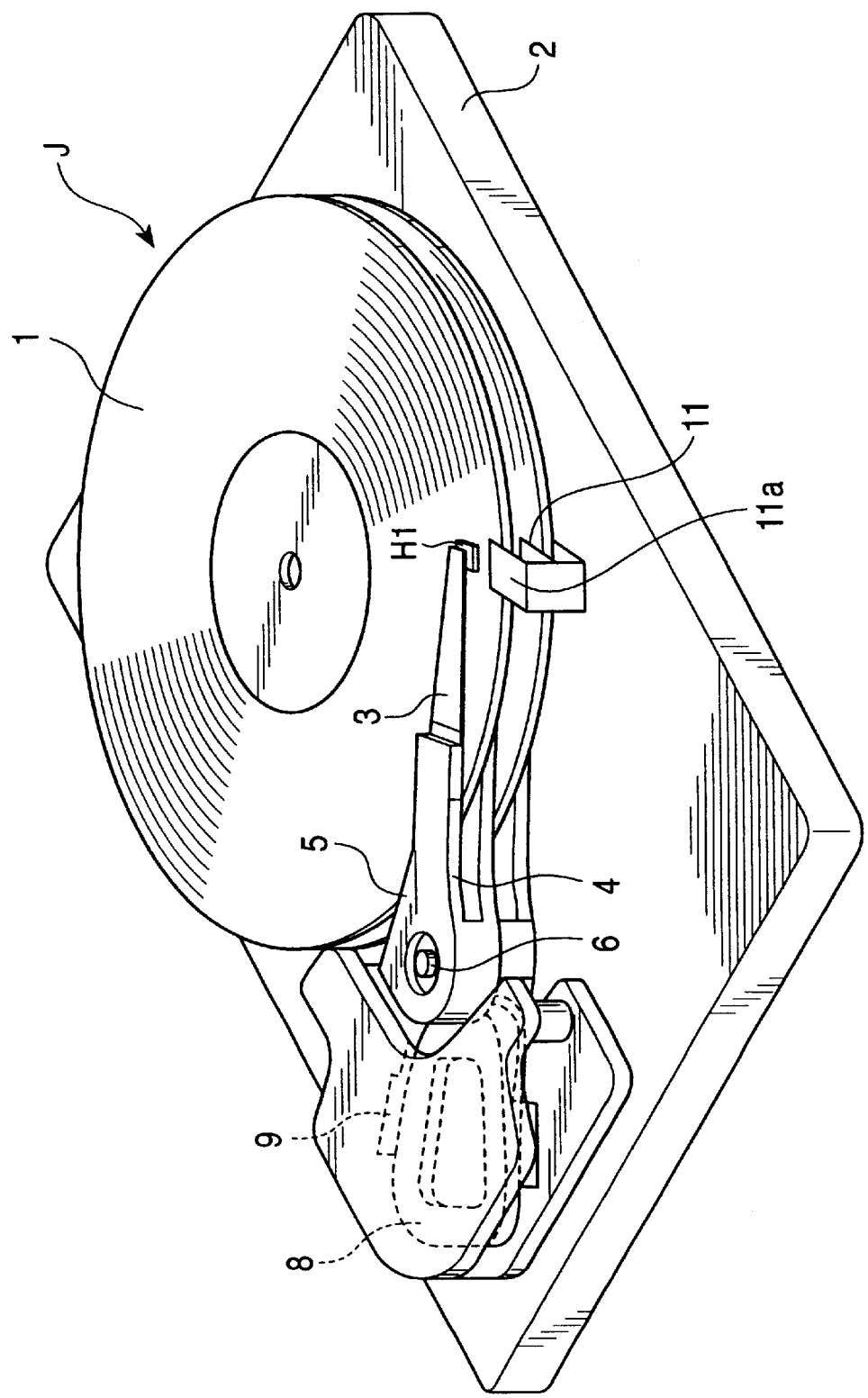
FIG. 3 is a perspective view showing an example of a magnetic recording apparatus in which the magnetic head of the present invention is mounted.

In the magnetic recording apparatus J shown in FIG. 3, a plurality of (two in the drawing) disc-like magnetic disks 1 having magnetic layers thereon are rotatably provided on a chassis 2, and magnetic heads S are provided so as to be capable of moving relative to the obverse or reverse sides of these magnetic discs 1, and the plurality of magnetic heads H1 are individually supported through mounting substrates (not shown) called flexures through load beams 3 in the form of thin and narrow triangular plates and arms 4 by a base 5, which base 5 is rotatably supported on the chassis 2.

On the upper side of the chassis 2, two magnetic recording mediums 1 are stacked together with a gap therebetween, and supported so as to be rotatable around a rotation shaft passing through the centers of the magnetic recording mediums 1. Below the rotation shaft at the center of the magnetic recording mediums 1, there is provided a flat spindle motor, by means of which the magnetic recording mediums 1 are rotated.

In reality, a cover member (not shown) is provided close to the upper side of the magnetic recording apparatus J shown in FIG. 3 to use the chassis 2 in an enclosed state. In FIG. 3, this cover member 3 is omitted, showing only the inner construction of the magnetic recording apparatus J. Further, magnetic layers are provided on the obverse and reverse sides of the magnetic recording mediums 1, and, in these magnetic layers, a large number of tracks having a minute width are formed circumferentially, and the magnetic heads H1 move in the radial direction of the magnetic recording mediums 1 so as to be movable between target tracks.

That is, in the construction shown in FIG. 3, the base 5 rotates to thereby cause the magnetic heads H1 to move radially relative to the magnetic disks 1, and magnetic information at desired positions on the magnetic disks 1 is read, or magnetic information is written to desired positions on the magnetic disks 1.

Further, in the support structure for the base 5 shown in FIG. 3, the base 5 rotates around a rotation shaft arranged parallel to the rotation shaft of the magnetic disk 1, and the magnetic heads H1 move radially over (or under) the magnetic disks 1 to predetermined positions, thereby realizing the movement of the magnetic heads H1. Further, the drive structure for the base 5 shown in FIG. 3 is a voice coil motor structure in which a voice coil 8 is combined with an electromagnet 9, making it possible for the magnetic heads H1 to make a minute positional movement.

Further, there is provided a retraction portion 11 by the side of the portion where the magnetic heads H1 reach the outermost peripheral portions of the magnetic recording mediums 1 as a result of the rotation of the arms 4. This retraction portion 11 has support plates 11a facing the upper sides or lower sides of the magnetic recording mediums 1, and when the magnetic recording mediums 1 stop rotating, the magnetic heads H1 retract onto the support plates 11a along inclined surfaces formed on the recording medium side of these support plates 11a.

Here, the construction of the magnetic head H1 of this embodiment will be described in detail. FIG. 1 is a diagram showing the bottom side (medium opposing side) of the magnetic head H1. This magnetic head H1 mainly comprises, as shown in FIG. 1, a plate-like main body portion 14 formed of a non-magnetic hard ceramic material such as $Al_2O_3$—TiC, an insulating layer 16 coating one side (the left-hand side in FIG. 1) of the main body portion 14, and a magnetic core 17 embedded inside the insulating layer 16, the main body portion 14 and the insulating layer 16 being combined to form the slider main body 15.

Referring to FIG. 1, in the slider main body 15, the right-hand side is the leading side 18 directed to the upstream side with respect to the rotating direction of the magnetic recording medium 1, and the left-hand side is the trailing side 19 directed to the downstream side with respect to the rotating direction of the magnetic recording medium 1, the insulating layer 16 being provided on the trailing side 19. Further, the leading side end surface of the slider main body 15 is the front surface 15A, and the trailing side end surface of the slider main body 15 is the rear surface 15B, the other end surfaces of the slider main body 15 being side surfaces 15C.

In the medium opposing surface (bottom surface) of the slider main body 15, there is formed at the end portion on the leading side 18 a thin and narrow inclined surface 20 occupying substantially the entire width (the longitudinal width in FIG. 1) of the slider main body 15, and connected to this inclined surface 20 is a thin and narrow front rail 21 extending in the width direction of the slider main body 15, main rail portions 22 and 23 extending in the longitudinal direction of the slider main body 15 so as to be positioned on either side of the slider main body 15 being formed so as to be connected to the front rail 21. Between the main rail portions 22 and 23, there is formed a recess 24, and the surface of this recess 24 and the surfaces of the main rail portions 22 and 23 are all flat. However, the inclined surface 20 is formed as an inclined surface such that the thickness of the slider main body 15 gradually decreases toward the front surface 15A, so that a great lift for flying may be generated utilizing the air pressure of the magnetic recording medium 1 being rotated.

Next, at the center with respect to the width direction on the trailing side 19 of the slider main body 15, there is formed a sub rail portion 25 which is rectangular in plan view, and a magnetic core 17 is provided in the insulating layer 16 on the rear side of the sub rail portion 25. And, on both sides of the sub rail portion 25, and at both ends of the trailing side 19 of the slider main body 15, there are formed protrusions 26.

These protrusions are circular in plan view, and formed of a material which the same as the non-magnetic material forming the slider main body 15 or some other material. More specifically, the medium opposing side of the slider main body 15 is processed by an etching means used in photolithography to form the recess 24, and, when forming the main rail portions 22 and 23 and the sub rail portion 25 by forming the recess 24, the protrusions 26 are simultaneously formed. Further, when performing etching on the slider main body 15, it is also possible to form no protrusions 26, providing a layer such as a carbon layer by a layer forming means such as sputtering after the etching and then performing etching to thereby form protrusions 26 consisting of carbon. It is desirable that these protrusions 26 have a circular or elliptical configuration having a radius of curvature of not less than $5 \times 10^{-6}$ m.

It is desirable that the position and height of the protrusions 26 be such that they satisfy the following formula: first, assuming that the height of the sub rail portion 25 is $h_1$, that the height of the protrusions 26 is $h_2$, that the distance from the side surface 15C of the slider main body 15 to the position where the protrusion 26 is formed is $L_1$, that the distance from the side surface 15C of the slider main body 15 to the position where the sub rail portion 25 is formed is $L_2$, and that the distance between the side surface 25a on the protrusion 26 side of the sub rail portion 25 and the surface 26a on the side of the side surface 26C nearer to the protrusion 26 is $L_3$, $$(L_1 \times h_1/L_2) < h_2 < h_1 - L_3 = (L_1 \times h_1/L_2) < h_2 < h_1 - (L_2 - L_1) \times 10^{-5} \ (mm)$$

By obtaining the value of $h_2$ satisfying the above equation, when rolling is generated in the slider main body 15 to cause the slider main body 15 to be inclined such that one end with respect to the width direction is above the other end, that is, when in the rolling condition, the protrusion 26 does not become closer to the magnetic recording medium 1 than the sub rail portion 25 if an inclination of approximately $1 \times 10^{-5}$ rad is generated in the slider main body 15; if an impact or load is applied from outside at the time of loading or unloading, the edge portion of the slider main body 15 does not come into contact with the surface of the magnetic recording medium.

Figure 4:
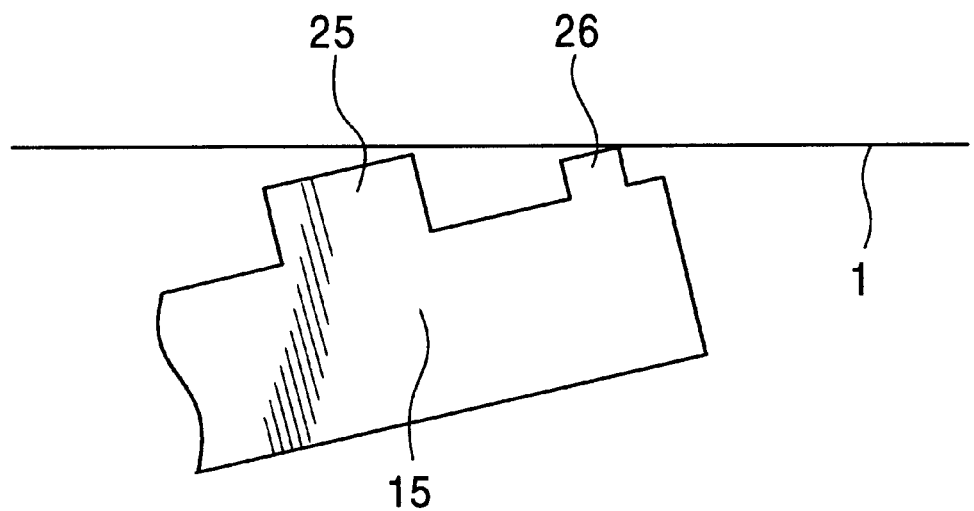
FIG. 4 is an explanatory diagram showing the magnetic head of FIG. 1 in an inclined state (rolling state) with respect to the magnetic recording medium.

When the magnetic head H1 of the construction shown in FIG. 1 flies over the magnetic recording medium 1, when rolling is generated for some reason in the magnetic head H1, the acute edge portion of the slider main body 15 does not come into contact with the magnetic recording medium 1, and, as shown in FIG. 4, the protrusion 26 comes into contact with the surface of the magnetic recording medium 1. Here, in plan view, the protrusion 26 is rounded off by not less than $5 \times 10^{-6}$ m, so that the concentration of stress is less as compared with the case in which the acute edge portion of the slider main body 15 comes into contact with the magnetic recording medium 1, so that there is little fear of the magnetic recording medium 1 being damaged. Thus, if the magnetic head H1 flies while generating rolling with respect to the magnetic recording medium 1, there is little fear of the magnetic recording medium 1 being damaged.

Figure 5:
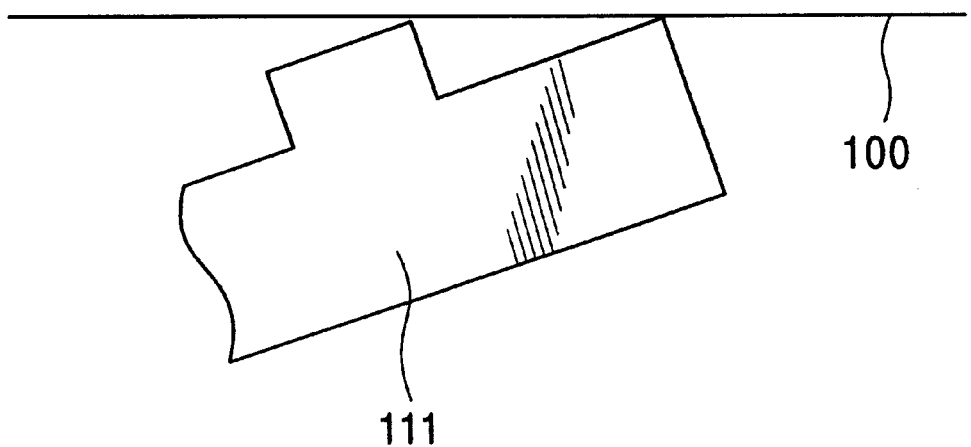
FIG. 5 is an explanatory diagram showing a conventional magnetic head in an inclined state (rolling state) with respect to the magnetic recording medium.

In contrast, when, as shown in FIG. 5, the conventional slider main body 111 having no protrusion 26 flies while generating rolling with respect to the magnetic recording medium 100, the edge portion of the slider main body 111 comes into contact with the magnetic recording medium 100, with the result that there is a fear of the acute edge portion of the slider main body coming into contact with the magnetic recording medium 100. If the edge portion of the slider main body 111 comes into contact with the magnetic recording medium 100 to damage the surface of the magnetic recording medium 100 to some degree, the magnetic recording medium 100 is formed in a multi-layer structure having a protective layer or the like, so that it does not become immediately impossible to read magnetic information from the magnetic recording medium 100. However, it is not desirable for the slider main body 111 to repeatedly come into contact with the magnetic recording medium 100, so that, in this regard, with the magnetic head H1 of this embodiment, there is no fear of the magnetic recording medium 1 being damaged by the edge portion of the slider main body 15.

Further, it is because the slider main body 15, which is formed of a hard ceramic material, is ground by a grinder that the edge portion of the slider main body is acute, and it might be possible to round off this edge portion by further grinding it. However, that would complicate the producing process and make it necessary to inspect the rounding finish, resulting in a large burden to the producing process. In contrast, in the case of the protrusion 26 of the slider main body 15, simultaneous processing can be easily conducted by varying the configuration of the mask member when machining the medium opposing surface of the slider main body 15 to form the rail portions 22, 23 and 25 by ion milling or the like, so that it can be easily put into practice.

As described above, in the construction of the present invention, if the magnetic head H1, which repeatedly flies, flies while generating rolling with respect to the magnetic recording medium 1, there is no fear of the magnetic recording medium 1 being damaged.

(Second Embodiment)

Figure 6:
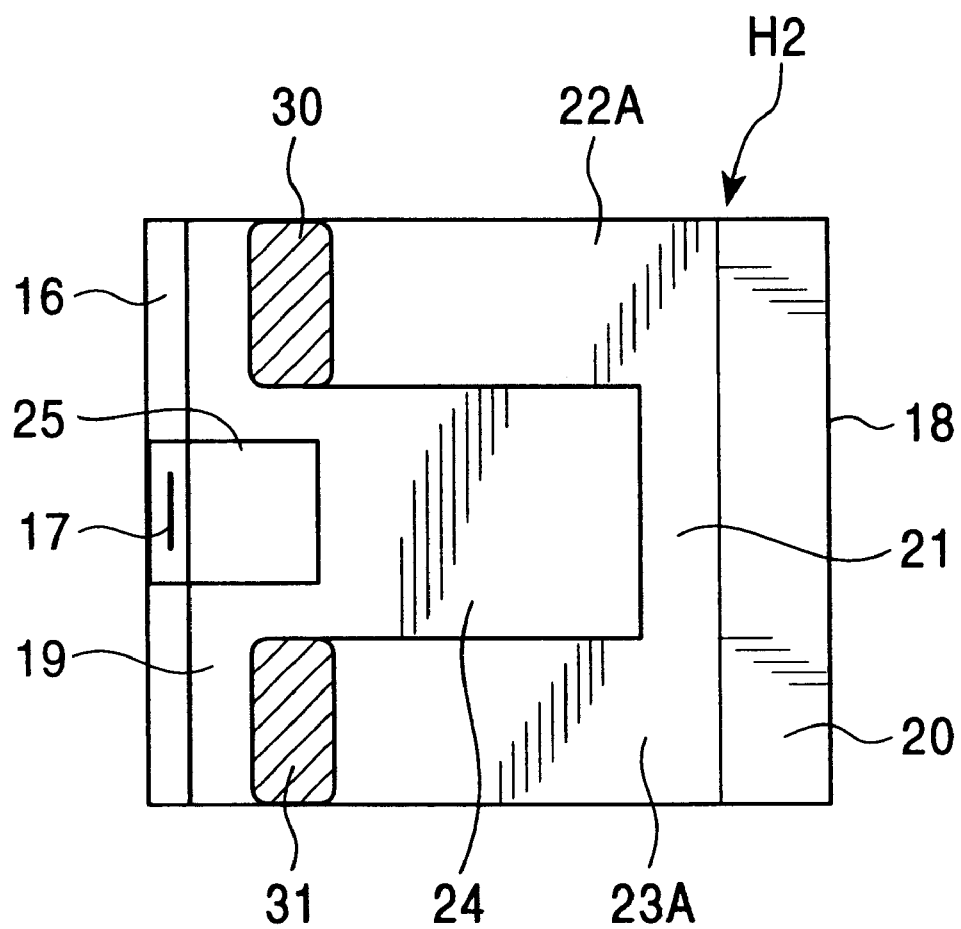
FIG. 6 is a bottom view of a magnetic head according to a second embodiment of the present invention.
Figure 7:
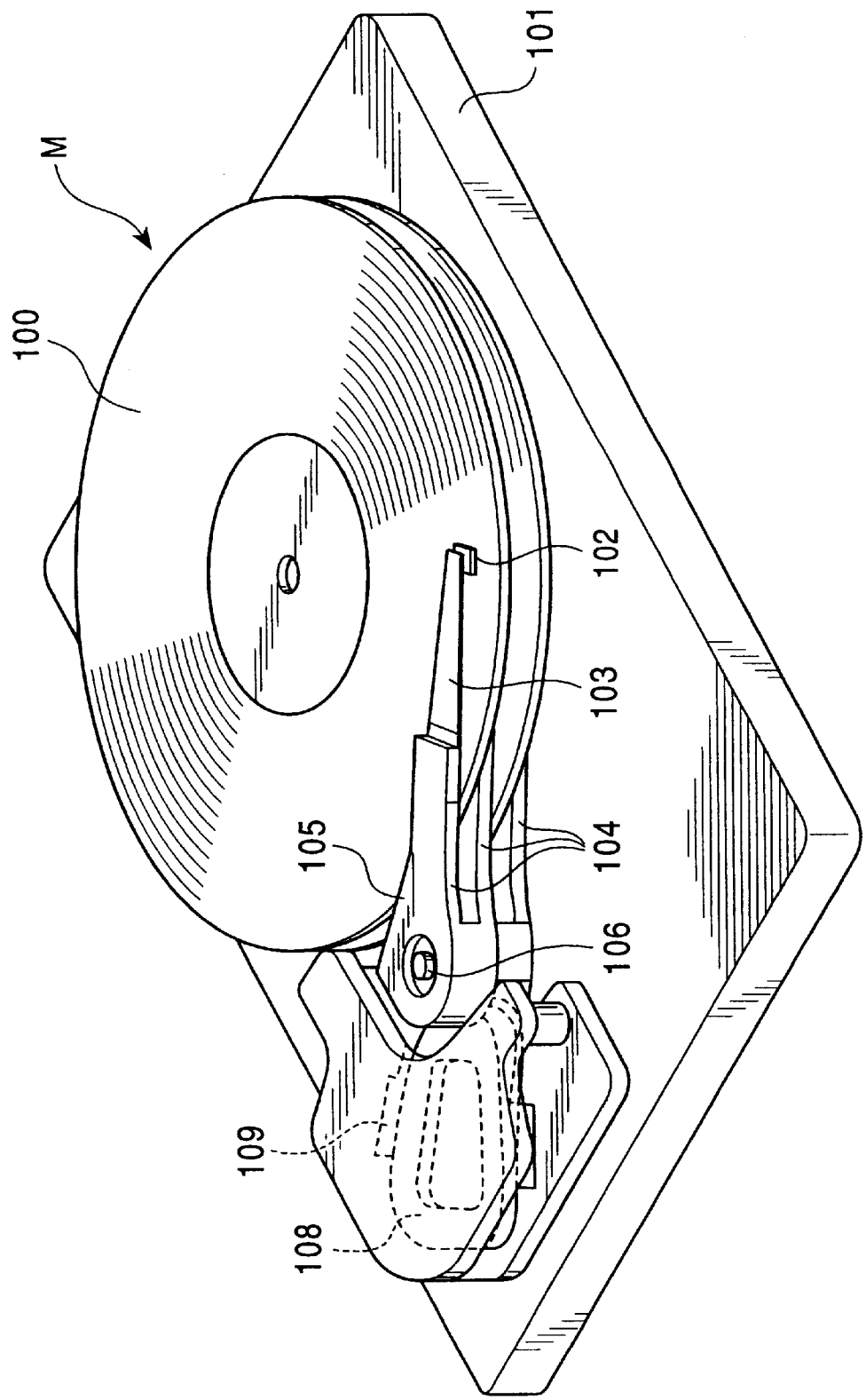
FIG. 7 is a perspective view showing an example of a conventional magnetic recording apparatus.
Figure 8:
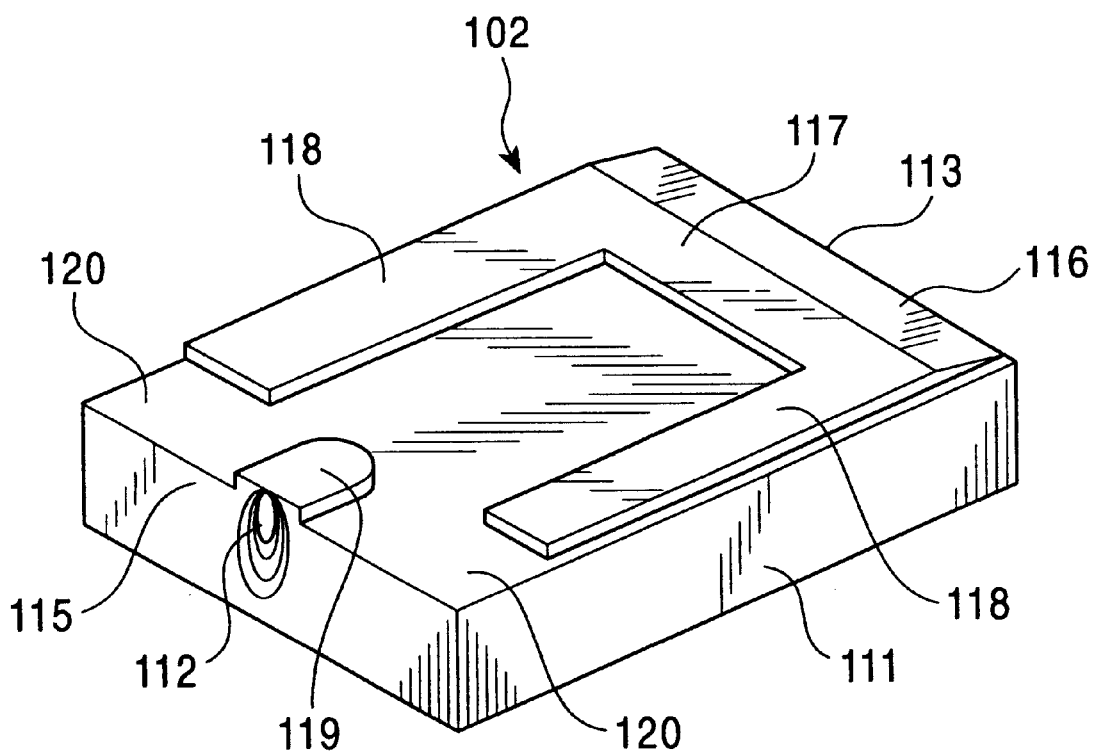
FIG. 8 is a bottom view showing a conventional magnetic head of the type mounted in the magnetic recording apparatus of FIG. 7.

FIG. 6 shows a second embodiment of the present invention. In the magnetic head H2 of this embodiment, the protrusion 26 of the magnetic head H1 of the first embodiment is omitted, and the main rail portions 22A and 23A extend to the vicinity of the region where the protrusion 26 is formed, and step portions 30 and 31 are provided at the end on the trailing side of the rail portions 22A and 23A such that they are lower than the rail portions 22A and 23A. It is desirable that the trailing side end portions of the rail step portions 30 and 31 be rounded off as in the case of the protrusion 26 of the first embodiment.

When the magnetic head H2 provided with the step portions 30 and 31 flies relative to the magnetic recording medium 1, the main rail portions 23A and 23B receive air pressure from the magnetic recording medium 1 to generate positive pressure. In addition to this, the step portions 30 and 31, which are one step higher than the recess 24, also generate positive pressure, so that it is possible to effect flying with the trailing side 19 of the slider main body 15 being higher than that of the magnetic head H1 of the first embodiment. Thus, the edge portion on the trailing side of the slider main body does not come into contact with the magnetic recording medium 1. Further, when forming the rail step portions 30 and 31 at the end on the trailing side of the main rail portions 22A and 23A, the machining is possible by performing etching on the medium opposing surface. In this process, when the end portions on the trailing side of the rail step portions 30 and 31 are rounded off, there is no fear of the magnetic recording medium 1 being damaged if the trailing side end portions of the rail step portions 30 and 31 come into contact with the magnetic recording medium 1.

Thus, in the magnetic head H2 of the second embodiment also, it is possible to lessen the fear of the magnetic recording medium 1 being damage if the flying relative to the magnetic recording medium 1 is repeated. Further, if the construction of this embodiment is adopted in a magnetic recording apparatus of the lamp load type, and an impact or load applies from outside while the magnetic head H2 is flying, it is possible to provide a magnetic head in which there is little fear of the trailing side end portion of the magnetic head H2 coming into contact with the magnetic recording medium 1.

As described above, in accordance with the present invention, there is formed in the corner portion of the trailing side medium opposing surface of the slider main body a protrusion which is lower than the rail portions and which comes closer to the magnetic recording medium than the trailing side end portion of the slider main body when the slider main body is in a rolling state, so that, when the slider main body flies in an inclined state so as to generate rolling with respect to the magnetic recording medium, one of the trailing side end portions with respect to the width direction of the slider main body approaches the magnetic recording medium. However, if in this state an impact or load acts from outside, the protrusion comes into contact with the magnetic recording medium before the trailing side end portions of the slider main body come into contact with the magnetic recording medium. Thus, there is no fear of the trailing end portion, which is an acute edge portion of the slider main body, coming into contact with the magnetic recording medium.

Further, by forming this protrusion in a configuration which is not acute as the corner portion of the end portion of the slider main body, there is no fear of the magnetic recording medium being damaged if the protrusion comes into contact with the magnetic recording medium.

Further in accordance with the present invention, the rail step portion formed on the trailing side of the rail portion generates positive pressure when the magnetic head flies to cause the trailing side of the magnetic head to fly, so that the force with which the trailing side of the magnetic head is brought into contact with the magnetic recording medium is restrained. Thus, if rolling is generated in the magnetic head by an impact or load from outside and the trailing side end portion of the magnetic head approaches the magnetic recording medium, it is possible to prevent the trailing side end portion from strongly hitting the magnetic recording medium.

Further, in the case in which the present invention is applied to a lamp load type magnetic recording apparatus, when at the time of loading the magnetic head approaches the magnetic recording medium in an inclined state to start flying, if an impact or load is applied from outside, it is possible to eliminate the fear of the magnetic recording medium being damaged by the edge portion of the trailing side end portion of the magnetic head.

Further, in the magnetic head of the present invention, it is desirable that the relationship: $(L_1 \times h_1/L_2) < h_2 < h_1 - (L_2 - L_1) \times 10^{-5}$ (mm) hold true, where $h_1$ is the height of the sub rail portion, $h_2$ is the height of the protrusion, $L_1$ is the distance from the side surface of the slider main body to the protrusion, and $L_2$ is the distance from the side surface of the slider main body to the sub rail portion.

By adjusting the height of the protrusion so as to satisfy the above relationship, the protrusion does not become lower than the sub rail portion if rolling is caused in the magnetic head and the magnetic head is inclined by a minute angle of approximately $1 \times 10^{-5}$ rad, so that it is possible to prevent the end portion of the slider main body on the trailing side of the magnetic head from colliding with the magnetic recording medium.

What is claimed is:

1. A magnetic recording apparatus comprising a magnetic head, a magnetic recording medium which is rotated, and a supporting mechanism for moving the magnetic head in the radial direction of the magnetic recording medium, a retraction portion being provided for the magnetic head by the side of an outermost peripheral portion of the magnetic recording medium, the magnetic head comprising a magnetic head slider including a slider main body which flies with a medium opposing surface being directed to a rotated magnetic recording medium and which is provided with a magnetic core for performing recording or reproduction of magnetic information, wherein there is provided on the medium opposing surface of the slider main body a rail portion for causing the slider main body to fly, wherein, in the slider main body, the upstream side with respect to the rotating direction of the magnetic recording medium is a leading side, and the downstream side with respect to the rotating direction is a trailing side, wherein there is provided in a corner portion of the medium opposing surface on the trailing side of the slider main body a protrusion which is lower than the rail portion and which is closer to the magnetic recording medium than the end portion on the trailing side of the slider main body in the rolling state of the slider main body, wherein the slider main body is composed of a main body portion which occupies the greater portion of the leading side and the trailing side and which is formed of a non-magnetic hard ceramic material, and an insulating layer formed by coating at the end portion on the trailing side of this main body portion, wherein the magnetic core is embedded in the insulating layer, the protrusion being formed only on the main body portion adjacent to the border portion between the main body portion and the insulating layer, and the protrusion being formed in a round or elliptical configuration in plan view which is rounded off, wherein the rail portion is provided with a sub rail portion formed at the center of the medium opposing surface on the trailing side of the slider main body, and a main rail portion formed so as to extend from the leading side of the slider main body positioned on the upstream side with respect to the rotating direction of the magnetic recording medium to the trailing side of the slider main body, and a magnetic core is formed in the vicinity of the sub rail portion, and the height of the protrusion is smaller than the height of the sub rail portion, and wherein the relationship: $(L_1 \times h_1/L_2) < h_2 < h_1 - (L_2 - L_1) \times 10^{-5}$ (mm) holds true, where $h_1$ is the height of the sub rail portion, $h_2$ is the height of the protrusion, $L_1$ is the distance from the side surface of the slider main body to the protrusion, and $L_2$ is the distance from the side surface of the slider main body to the sub rail portion.

2. A magnetic recording apparatus according to claim 1, wherein protrusions are formed on both sides of the sub rail portion, each protrusion being formed in a round or elliptical configuration in plan view which is rounded off by not less than $5 \times 10^{-6}$ m.

3. A magnetic recording apparatus according to claim 1, wherein the protrusion is formed of a carbon layer.

4. A magnetic recording apparatus comprising:

a magnetic head comprising a magnetic head slider including a slider main body which flies with a medium opposing surface being directed to the rotated magnetic recording medium and which is provided with a magnetic core for performing recording or reproduction of magnetic information, wherein, in the slider main body, the upstream side with respect to the rotating direction of the magnetic recording medium is a leading side, and the downstream side with respect to the rotating direction is a trailing side, wherein a rail portion for flying the slider main body is formed on the medium opposing surface of the slider main body so as to extend from the leading side to the trailing side, wherein the rail portion is provided with a sub rail portion formed at the center of the medium opposing surface on the trailing side of the slider main body, and a main rail portion formed so as to extend from the leading side of the slider main body positioned on the upstream side with respect to the rotating direction of the magnetic recording medium to the trailing side of the slider main body, wherein there is consecutively provided in the end portion on the trailing side of the main rail portion a rail step portion which is positioned in a corner portion of the medium opposing surface on the trailing side of the slider main body and which is lower than the other portion of the main rail portion, wherein a magnetic core is formed in the vicinity of the sub rail portion, and the height of the rail step portion is smaller than the height of the sub rail portion, and the end portion on the trailing side of the rail step portion is rounded off, and wherein the relationship $(L_1 \times h_1/L_2) < h_2 < h_1 - (L_2 - L_1) \times 10^{-5}$ (mm) holds true, where $h_1$ is the height of the sub rail portion, $h_2$ is the height of the rail step portion, $L_1$ is the distance from the side surface of the slider main body to the rail step portion, and $L_2$ is the distance from the side surface of the slider main body to the sub rail portion, a magnetic recording medium that is rotated;

a supporting mechanism for moving the magnetic head in the radial direction of the magnetic recording medium; and a retraction portion being provided for the magnetic head by the side of the outermost peripheral portion of the magnetic recording medium.

5. A magnetic recording apparatus according to claim 4, wherein trailing side end portions of the rail step portions are formed on both sides of the sub rail portion, each trailing side end portion of the rail step portion being formed in a round or elliptical configuration in plan view which is rounded off by not less than $5 \times 10^{-6}$ m.

6. A magnetic recording apparatus head according to claim 4, wherein the slider main body is composed of a main body portion which occupies the greater portion of the leading side and the trailing side and which is formed of a non-magnetic hard ceramic material, and an insulating layer formed by coating at the end portion on the trailing side of this main body portion, wherein the magnetic core is embedded in the insulating layer, the trailing side end portion of the rail step portion being formed in the border portion between the main body portion and the insulating layer.

* * * * *

UNITED STATES PATENT AND TRADEMARK OFFICE
CERTIFICATE OF CORRECTION

PATENT NO. : 6,657,819 B2
DATED : December 2, 2003
INVENTOR(S) : Hirohisa Ishihara It is certified that error appears in the above-identified patent and that said Letters Patent is hereby corrected as shown below:

<u>Title page,</u>
Item [57], ABSTRACT,
Line 11, after "trailing" delete "K".

<u>Column 12,</u>
Line 34, after "apparatus" delete "head".

Signed and Sealed this

Twenty-fourth Day of February, 2004

JON W. DUDAS
*Acting Director of the United States Patent and Trademark Office*